Feb. 8, 1949.   R. G. SELL ET AL   2,461,087
ALTERNATING ELECTRIC CURRENT RECTIFIER
OF THE DRY SURFACE CONTACT TYPE
Filed Dec. 21, 1945

INVENTORS
Richard Geoffrey Sell and
BY Leslie Ernest Thompson.

THEIR ATTORNEY

Patented Feb. 8, 1949

2,461,087

UNITED STATES PATENT OFFICE 2,461,087

ALTERNATING ELECTRIC CURRENT RECTIFIER OF THE DRY SURFACE CONTACT TYPE

Richard Geoffrey Sell and Leslie Ernest Thompson, London, England, assignors, by mesne assignments, to The Union Switch and Signal Company, Swissvale, Pa., a corporation of Pennsylvania Application December 21, 1945, Serial No. 636,460
In Great Britain July 31, 1945

4 Claims. (Cl. 175—366)

This invention relates to electrical rectifiers of the dry surface contact type such, for example, as the well-known selenium and copper oxide rectifiers, and has for its object to provide an improved construction of apparatus of this character which shall be proof against adverse atmospheric influence and thus suitable for continuous service under all conditions.

The invention more particularly relates to rectifier apparatus in which cooling members comprising external flanges or fins are provided for insuring the effective dissipation from the rectifier elements of the heat generated during operation, and according to the principal feature of the invention each or a number of rectifier elements arranged in a stack or column is disposed and hermetically sealed in a suitable cell or cavity in the cooling member or members so as to be completely isolated from the external atmosphere.

The cell or cavity within which the rectifier element or stack of elements is located may be enclosed by two adjacent cooling members or a number of cooling members may be formed integral with one another so as to constitute a single casing provided with external fins or flanges and having an internal hermetically sealed cavity containing a stack or column of rectifier elements.

We shall describe two forms of rectifier elements embodying our invention, and shall then point out the novel features thereof in claims.

Figure 1:
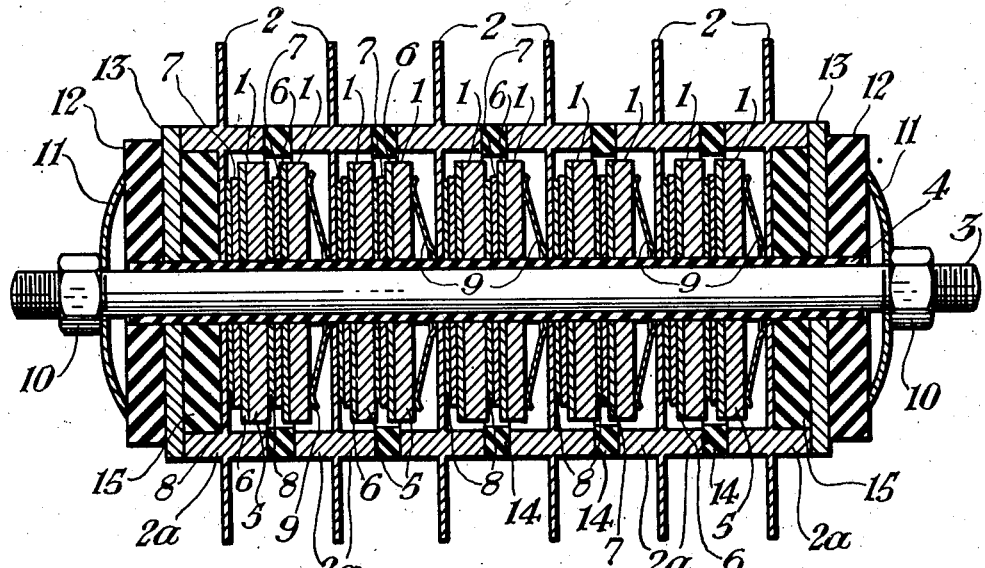
Figure 2:
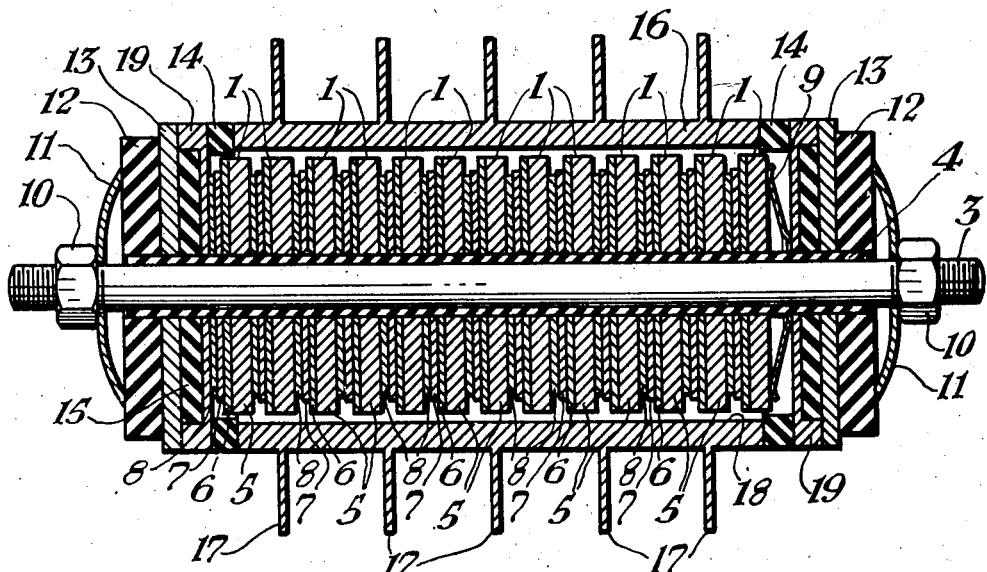

In the accompanying drawings, Fig. 1 is a vertical sectional view showing one form of rectifier embodying our invention. Fig. 2 is a view similar to Fig. 1 showing another form of rectifier embodying our invention.

Similar reference characters refer to similar parts in both views.

Referring first to Fig. 1, the rectifier here illustrated comprises a plurality of rectifier elements 1 and cooling members 2 mounted on a rod or bolt 3 surrounded by an insulating sleeve 4. The rectifier elements may be of any suitable type, but in the form shown they are of the well-known selenium type, and each comprises a circular sheet steel washer 5 coated on one face with a selenium composition 6 to which a counter-electrode layer 7 of suitable conducting material is applied.

Each cooling member 2 in the form illustrated consists of a rectangular plate of good heat conducting material, such as aluminum, provided with a central aperture to accommodate the bolt 3 and sleeve 4. Projecting from each face of each cooling member is an annular boss or rib 2a which is coaxial with the central aperture, and which has a diameter at its inner edge which is slightly larger than the external diameter of the rectifier elements. The lengths of the bosses or ribs 2a are such that when two adjacent cooling members 2 are spaced apart the desired distance on the bolt 3, the bosses or ribs 2a on the confronting sides of these cooling members will abut against one another, and will thus form a cavity which encloses one or more of the rectifier elements. As shown in the drawing, each cavity formed by the abutting bosses or ribs on adjacent cooling members is of sufficient length to enclose two rectifier elements together with two spacer washers 8 and a spring washer 9, which washers are provided to maintain the rectifier elements in effective electrical contact with the cooling members and with one another.

The parts are clamped together on the rod or bolt by means of nuts 10 screwed onto the ends of the bolt, and interposed between each nut and the adjacent cooling member is a spring washer 11, an insulating washer 12, and a clamping washer 13.

In order to hermetically seal the cavities formed by the abutting bosses on the cooling members, an annular gasket 14 of rubber or other suitable material is interposed between the abutting faces of the bosses, and an annular gasket 15 is provided between each clamping washer 13 and the adjacent cooling member, this latter gasket being of such size that it will effectively seal the opening which would otherwise exist between the insulating sleeve and the central aperture in each of the outer cooling members.

The assembled rectifier thus comprises a number of abutting cooling members the bosses or ribs of which enclose a series of cells or cavities each containing one or more rectifier elements, these cells being hermetically sealed either individually or at each end of the series so that all of the rectifier elements are completely protected from the access of external air.

It should be pointed out that while the construction just described provides a means for completely hermetically sealing the units without the use of paint or the like, if desired the whole assembly may be covered with a paint film in order to seal the small pin holes which might exist due to non-alignment of components or porosity of the metal.

Referring now to Fig. 3, in the modified construction here shown the several cooling members are combined into a single integral tubular casing 16 provided with external fins or flanges 17 and containing a single internal cavity 18 within which the rectifier elements 1 arranged in a stack or column are located, the casing being provided with end caps 19 hermetically sealed to the casing and rod or bolt in the manner above described.

Although we have herein shown and described only two forms of alternating current rectifiers embodying our invention, it is understood that various changes and modifications may be made therein within the scope of the appended claims without departing from the spirit and scope of our invention.

Having thus described our invention, what we claim is:

1. A rectifier comprising two adjacent cooling members each provided with an annular rib which with the corresponding rib on the other element forms a cavity, and a rectifier sealed within said cavity in heat transfer relation with respect to said cooling members.

2. A rectifier comprising a rectifier element and two cooling members assembled on a bolt, said cooling members each being provided with an annular boss or rib which with the corresponding rib on the other member forms a cavity which receives said rectifier element, and means for hermetically sealing said cavity.

3. A rectifier comprising a plurality of rectifier elements and cooling members assembled in good heat transfer relation on a supporting member, each said cooling member comprising a plate provided on each side with an annular rib which abuts against the corresponding rib on the adjacent cooling member or members and forms a cavity which receives one or more of said rectifier elements, and an annular gasket interposed between each pair of abutting faces of said ribs to seal the cavity formed by the associated ribs.

4. A rectifier comprising a stack of rectifier elements and cooling members assembled in good heat transfer relation on a clamping bolt, each said cooling member comprising a rectangular plate provided with a centrally located aperture to receive the bolt and with a coaxial rib on each side having a diameter at its inner edge which is slightly larger than the external diameter of said rectifier elements, said ribs being of such lengths that the ribs on the confronting sides of adjacent cooling members will abut against one another and will thus form a cavity which encloses one or more of said rectifier elements, a gasket interposed between the abutting faces of each pair of abutting ribs, and other gaskets surrounding the bolt and the central aperture in each of the outer cooling members, whereby the cavities formed by the cooling members are hermetically sealed.

RICHARD GEOFFREY SELL.
LESLIE ERNEST THOMPSON.

REFERENCES CITED

The following references are of record in the file of this patent:

UNITED STATES PATENTS

| Number | Name | Date |
| --- | --- | --- |
| 1,728,537 | Gieger | Sept. 17, 1929 |
| 2,117,020 | Conrad | May 10, 1938 |
| 2,126,765 | Freeman | Aug. 16, 1938 |
| 2,343,379 | Kotterman | Mar. 7, 1944 |
| 2,383,735 | Ray | Aug. 28, 1945 |
| 2,406,806 | Clarke | Sept. 3, 1946 |

FOREIGN PATENTS

| Number | Country | Date |
| --- | --- | --- |
| 163,675 | Switzerland | Aug. 31, 1933 |
| 548,391 | Germany | Apr. 11, 1932 |
| 593,239 | Germany | July 6, 1940 |